(12) United States Patent
Rees et al.

(10) Patent No.: US 6,342,123 B1
(45) Date of Patent: Jan. 29, 2002

(54) METHOD AND APPARATUS FOR FORMING HEAT SEALS WITH FILMS

(76) Inventors: Blake M. Rees, 1326 Barnes Rd., Leslie, MI (US) 49251; Brian L. Rockafellow, 11219 W. Lincoln Rd., Riverdale, MI (US) 48877

(*) Notice: Subject to any disclaimer, the term of this patent is extended or adjusted under 35 U.S.C. 154(b) by 0 days.

(21) Appl. No.: 09/389,964

(22) Filed: Sep. 3, 1999

(51) Int. Cl.$^7$ .................. B32B 31/08; B32B 31/18; B32B 31/20
(52) U.S. Cl. .................. 156/282; 156/269; 156/292; 156/308.4; 156/324; 156/510; 156/553; 156/581; 53/285; 53/451; 53/477; 53/558
(58) Field of Search .................. 156/282, 290, 156/292, 324, 308.4, 250, 510, 553, 581, 269; 53/451, 477, 285, 558, 341; 100/305, 315, 324, 325, 326

(56) References Cited

U.S. PATENT DOCUMENTS

| | | | |
|---|---|---|---|
| 2,932,385 | A | 4/1960 | Bollmeier et al. |
| 2,948,999 | A | 8/1960 | Schlayer et al. |
| 3,074,544 | A | 1/1963 | Bollmeier et al. |
| 3,344,576 | A | 10/1967 | Cloud et al. |
| 3,453,799 | A | 7/1969 | Cloud et al. |
| 3,478,492 | A | 11/1969 | Cloud et al. |
| 3,563,001 | A | 2/1971 | Cloud et al. |
| 3,597,898 | A | 8/1971 | Cloud |
| 3,608,709 | A | 9/1971 | Pike |
| 3,821,873 | A | 7/1974 | Benner et al. |
| 3,908,979 | A | 9/1975 | Cloud et al. |
| 3,913,789 | A | 10/1975 | Miller |
| 4,062,718 | A * | 12/1977 | Hay, II |
| 4,108,712 | A * | 8/1978 | Bala et al. |
| 4,201,031 | A | 5/1980 | Wiles |
| 4,266,692 | A | 5/1981 | Clark |
| 4,295,908 | A * | 10/1981 | Schaefer et al. |
| 4,312,473 | A | 1/1982 | Hoeller |
| 4,316,566 | A | 2/1982 | Arleth et al. |
| 4,436,576 | A | 3/1984 | Seiden |
| 4,462,224 | A | 7/1984 | Dunshee et al. |
| 4,537,308 | A | 8/1985 | Hollander |
| 4,608,043 | A | 8/1986 | Larkin |
| 4,719,741 | A * | 1/1988 | Mabry |
| 4,759,472 | A | 7/1988 | Strenger |
| 4,779,400 | A * | 10/1988 | Hoskinson et al. |
| 4,792,373 | A * | 12/1988 | Hsei et al. |
| 4,805,767 | A | 2/1989 | Newman |
| 4,872,556 | A | 10/1989 | Farmer |
| 4,890,744 | A | 1/1990 | Lane et al. |
| 4,923,095 | A | 5/1990 | Dorfman et al. |
| 4,952,068 | A | 8/1990 | Flint |
| 4,986,076 | A | 1/1991 | Kirk et al. |
| 5,035,348 | A | 7/1991 | Siefert |
| 5,094,657 | A | 3/1992 | Dworak et al. |
| 5,100,028 | A | 3/1992 | Siefert |
| 5,131,760 | A | 7/1992 | Farmer |
| 5,181,365 | A | 1/1993 | Garvey et al. |
| 5,209,347 | A | 5/1993 | Fabisiewicz et al. |
| 5,235,794 | A * | 8/1993 | Center |
| 5,263,609 | A | 11/1993 | Hoshino |
| 5,287,961 | A | 2/1994 | Herran |
| 5,364,486 | A | 11/1994 | Falla et al. |
| 5,423,421 | A | 6/1995 | Inoue et al. |
| 5,441,345 | A | 8/1995 | Garvey et al. |

(List continued on next page.)

*Primary Examiner*—Curtis Mayes
(74) *Attorney, Agent, or Firm*—Ian C. McLeod

(57) ABSTRACT

An apparatus (10) and method for forming differentially frangible seals (FS) in a final closed pouch (FCP) are described. The method involves differential cooling a seal portions of pouch forming dies (15, 15A) with a fluid directed at or in a portion of the die. The method is useful for forming pouches with dual chambers separated by a frangible seal and surrounded by a hard seal, one chamber for a liquid (L) and the other chamber for another material (M). Single pouches are also described.

21 Claims, 17 Drawing Sheets

U.S. PATENT DOCUMENTS

| | | |
|---|---|---|
| 5,492,219 A | 2/1996 | Stupar |
| 5,494,190 A | 2/1996 | Boettcher |
| 5,502,952 A | 4/1996 | Wildmoser |
| 5,571,370 A * | 11/1996 | Selberg et al. |
| 5,616,337 A | 4/1997 | Kasianovitz et al. |
| 5,699,902 A | 12/1997 | Sperry et al. |

* cited by examiner

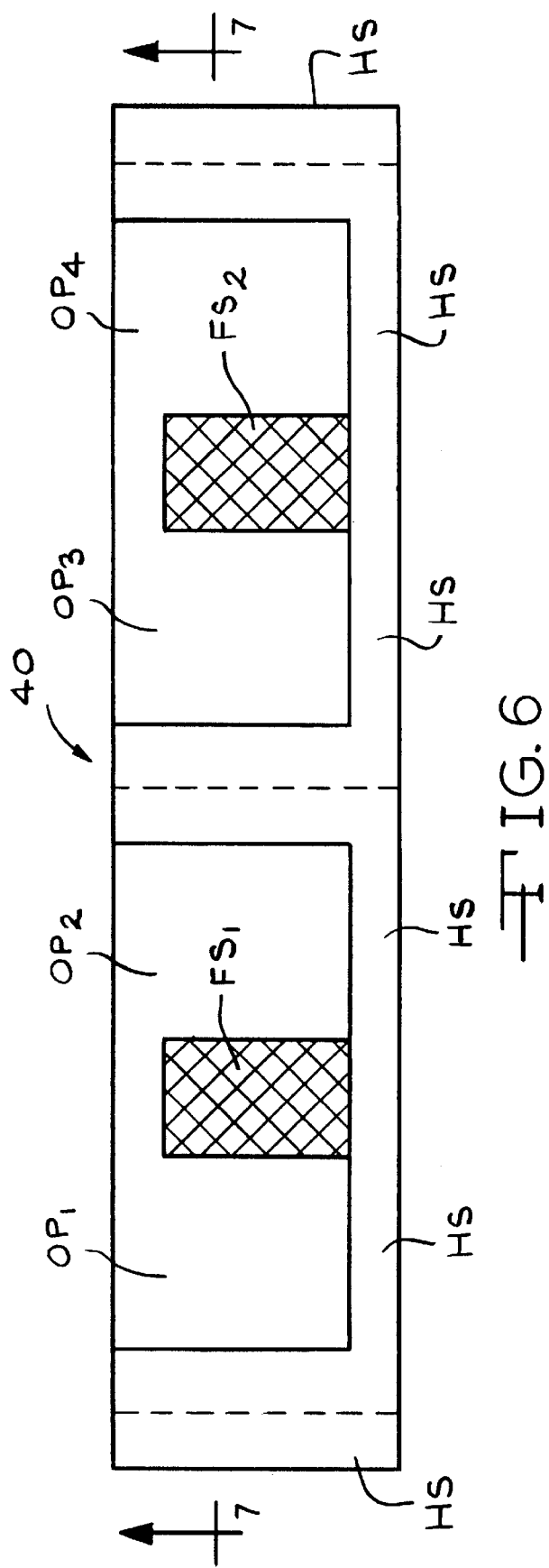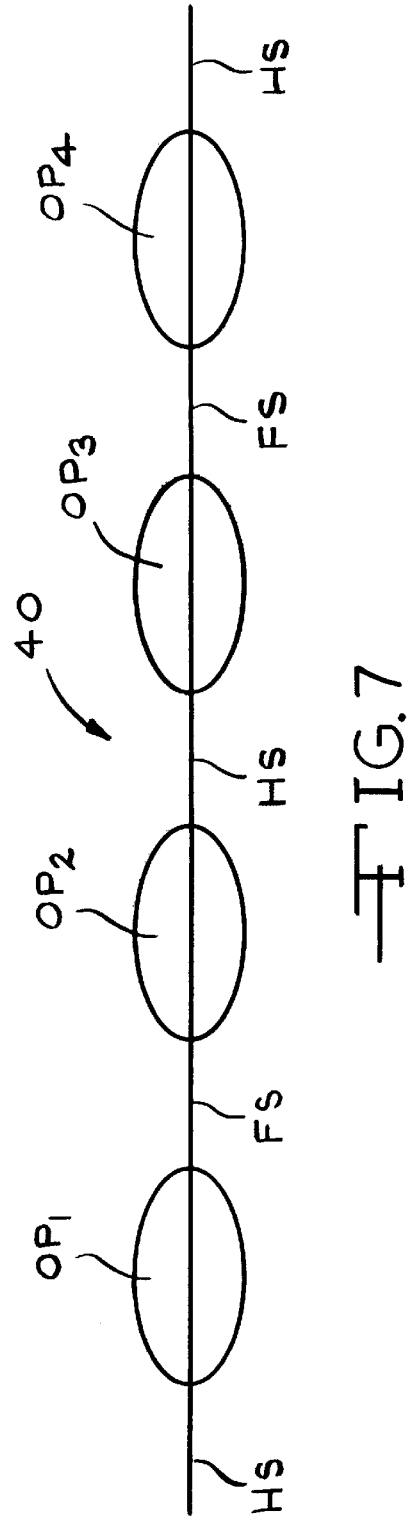
FIG. 6
FIG. 7

METHOD AND APPARATUS FOR FORMING HEAT SEALS WITH FILMS

GOVERNMENT FUNDING

None

CROSS REFERENCE TO RELATED APPLICATION

None

BACKGROUND OF THE INVENTION

1. Field of Invention

The present invention relates to a method and apparatus for forming heat seals with films, particularly in pouches with a manually frangible (rupturable) seal. The frangible seal is preferably adjacent to hard seals which are not manually rupturable without destruction of the film. In particular, the present invention relates to a method and apparatus wherein a cooling fluid (gas or liquid) is used to cool portions of a die which forms the frangible seal.

2. Description of Related Art

The production of pouches with frangible seals which can be ruptured manually (by hand) to release or mix the contents of the pouch are well known to those skilled in the art. In particular, dual pouches separated by a frangible seal are well known to those skilled in the art. Illustrative are U.S. Pat. No. 2,932,385 to Bollmeier et al; U.S. Pat. No. 3,074,544 to Bollmeier et al; U.S. Pat. No. 3,608,709 to Pike; U.S. Pat. No. 3,913,789 to Miller; U.S. Pat. No. 4,266,692 to Clark; U.S. Pat. No. 4,312,473 to Hoeller; U.S. Pat. No. 4,462,224 to Dunshee et al; U.S. Pat. No. 4,537,308 to Hollander; U.S. Pat. No. 4,608,043 to Larkin; U.S. Pat. No. 4,805,767 to Newman; U.S. Pat. No. 4,872,556 to Farmer; U.S. Pat. No. 4,890,744 to Lane et al; U.S. Pat. No. 4,986,076 to Kirk et al; U.S. Pat. No. 4,923,095 to Dorfman et al; U.S. Pat. No. 4,952,068 to Flint; U.S. Pat. No. 5,131,760 to Farmer; U.S. Pat. No. 5,209,347 to Fabisiewicz et al; U.S. Pat. No. 5,263,609 to Hoshino; U.S. Pat. No. 5,287,961 to Herran; U.S. Pat. No. 5,364,486 to Falla et al; U.S. Pat. No. 5,423,421 to Inoue et al; U.S. Pat. No. 5,492,219 to Stupar; U.S. Pat. No. 5,494,190 to Boettcher; U.S. Pat. No. 5,616,337 to Kasianovitz et al; and U.S. Pat. No. 5,699,902 to Sperry et al.

The prior art has described the use of a lower temperature in the die to form a weaker seal which is frangible. U.S. Pat. No. 4,759,472 to Strenger discloses such a frangible seal without describing how the frangible seal is produced. Frangible seals are similarly generally described in U.S. Pat. No. 4,890,744 to Lane et al., U.S. Pat. No. 5,100,028 and 5,035,348 to Siefert; and U.S. Pat. No. 5,131,760 to Farmer.

The inventors are unaware of any prior art which describes the use of a cooling fluid (gas or liquid) to cool a portion of the sealing die during the formation of the frangible seal. U.S. Pat. No. 5,502,952 to Wildmoser describes air cooling when the machine is stopped, but not for forming a frangible seal. U.S. Pat. No. 2,948,999 to Schlayer et al uses air to cool a bead formed as part of a hard seal. U.S. Pat. No. 5,441,345 to Garvey et al shows cooling for a timing operation.

The prior art has described a number of different pouch forming and filling apparatus. Illustrative are: U.S. Pat. No. 3,344,576 to Cloud et al; U.S. Pat. No. 3,478,492 to Cloud et al; U.S. Pat. No. 3,563,001 to Cloud et al; U.S. Pat. No. 3,597,898 to Cloud; U.S. Pat. No. 3,821,873 to Benner et al; U.S. Pat. No. 3,908,979 to Cloud et al; U.S. Pat. No. 4,316,566 to Arleth et al; U.S. Pat. No. 5,094,657 to Dworak et al. There is no discussion of frangible seals in these patents.

OBJECTS

It is therefore an object of the present invention to provide a method and apparatus for forming a pressure frangible (rupturable) seal and a hard seal and a hard seal particularly between two sheets of a thermoplastic film in a pouch such that there is a significant differential between the seal strength of various hard and frangible portions of the seal. In particular, it is an object of the present invention to provide an apparatus and method whereby portions of the sealing areas of the pouch are made frangible so as to be pulled apart using novel differential cooling of a die which forms the seal. Further still, it is an object of the present invention to provide an apparatus which is relatively simple to construct and use and which is economical to operate. These and other objects will become increasingly apparent by reference to the following description and the drawings.

SUMMARY OF THE INVENTION

The present invention relates to a die for differentially heat sealing a film to another sealable material which comprises:

(a) a plate having a seal forming portion around a cavity, wherein a part of the seal forming portion of the plate is inletted to provide an opening around the part of the seal forming portion; and (b) conduit means mounted in the plate for providing a cooling fluid to the part in the opening in the plate for cooling the part of the seal forming portion in the portion of the plate which is inletted.

Also the invention relates to a die which is half of a pair of dies for differentially heat sealing opposed contacting sheets of a plastic film to form a pouch defined by a peripheral seal which comprises:

(a) a plate having a seal forming portion around a cavity for defining an inside of the pouch, wherein a part of the seal forming portion of the plate is inletted to provide an opening around the part of the seal forming portion; and (b) conduit means mounted in the plate for providing a cooling fluid to the part in the opening in the plate for cooling the part of the seal forming portion in the portion of the plate which is inletted.

In particular, the present invention provides a die which is preferably cooled by a cooling gas, such as air, directed at the part of the sealing area of the die which is to be cooled.

In particular, the present invention relates to an apparatus for differentially heat sealing a plastic film to a sealable material which comprises:

(a) a die for heat sealing which comprises: a plate having a seal forming portion around a cavity, wherein a part of the seal forming portion of the plate is inletted to provide an opening around the part of the seal forming portion; and conduit means mounted in the plate for providing a cooling fluid to the part in the opening in the die for cooling the part of the seal forming portion which is in the portion of the plate which is inletted;

(b) a fluid supply line connected to the conduit means mounted in the die;

(c) heating means in the pair of dies for heating the dies to provide the seal;

(d) motive means for closing the die against the plastic film to form the seal; and (e) feed means for feeding the plastic film between the dies so that the motive means for closing the die can close the die against the film to provide the seal with the sealable material.

Further, the present invention relates to an apparatus for differentially heat sealing opposed contacting sheets of a plastic film to form an individual pouch defined by a peripheral seal which comprises:

(a) a pair of dies for heat sealing opposed contacting sheets of a plastic film to form a pouch defined by a peripheral seal, one die of which comprises: a plate having a seal forming portion around a cavity defining an inside of the pouch, wherein a part of the seal forming portion of the plate is inletted to provide an opening around the part of the seal forming portion; and conduit means mounted in the plate for providing a cooling fluid to the part in the opening in the die for cooling the part of the seal forming portion which is in the portion of the plate which is inletted;

(b) a fluid supply line connected to the conduit means mounted in the die;

(c) heating means in the pair of dies for heating the dies to provide the seal;

(d) motive means for closing the dies against the plastic film to form the seal;

(e) feed means for feeding the sheets of plastic film between the dies so that the motive means for closing the dies can close the dies to provide the seal; and (f) shear means for cutting the sheets to separate multiple of the pouches formed in the sheets into individual pouches.

The present invention also relates to a method for differentially heat sealing a plastic material to a sealable material which comprises:

(a) a die for heat sealing which comprises:
a plate having a seal forming portion around a cavity, wherein a part of the seal forming portion of the plate is inletted to provide an opening around the part of the seal forming portion; and conduit means mounted in the plate for providing a cooling fluid to the part in the opening in the die for cooling the part of the seal forming portion which is in the portion of the plate which is inletted; a fluid supply line connected to the conduit means mounted in the die; heating means in the pair of dies for heating the dies to provide the seal; motive means for closing the die against the plastic material to form the seal; and feed means for feeding the plastic material between the dies so that the motive means for closing the die can close the die against the material to provide the seal with the sealable material;

(b) feeding sheets of plastic material between the dies and the sealable material;

(c) closing the die with the motive means so that the heating means seals the plastic material to the sealable material;

(d) removing the sealed plastic material and the sealable material from the apparatus.

Finally, the present invention relates to a method for forming a pouch defined by differentially heat sealed opposed sheets of a plastic material which comprises:

(a) heating dies for forming the seal provided in an apparatus for heat sealing opposed contacting sheets of a plastic material to form an individual pouch defined by a peripheral seal which comprises: a pair of dies for heat sealing opposed contacting sheets of a plastic material to form a pouch defined by a peripheral seal, one die of which comprises: a plate having a seal forming portion around a cavity defining an inside of the pouch, wherein a part of the seal forming portion of the plate is inletted to provide an opening around the part of the seal forming portion; and conduit means mounted in the die for providing a cooling fluid to the part in the opening in the plate for cooling the part of the seal forming portion which is in the portion of the plate which is inletted; a gas supply line connected to the conduit means mounted in the die with a gas flow rate meter in the line; heating means in the pair of dies for heating the dies to provide the seal; motive means for closing the dies against the plastic material to form the seal; feed means for feeding the sheets of plastic material between the dies so that the motive means for closing the dies can close the dies to provide the seal; and shear means for cutting the sheets to separate multiple of the pouches formed in the sheets into individual pouches;

(b) feeding the sheets of plastic material between the dies;

(c) closing the dies with the motive means so that the heating means forms the pouch wherein the gas from the gas supply means cools the part of the seal forming portion which is in the portion of the plate which is inletted;

(d) feeding the sheets with the pouch from between the dies; and (e) shearing the pouch from the sheets wherein the pouch has differentially sealed opposed sheets forming the pouch.

BRIEF DESCRIPTION OF THE DRAWINGS

FIG. 6 is a front view of preformed open pouches 40 (OP1 to OP4) for forming a pair of dual pouches. The dotted lines are for vertical trimming as in FIG. 8.

FIG. 7 is a plan cross-sectional view of the pouch OP along line 7—7 of FIG. 6.

FIGS. 13 to 15 show linear low density polyethylene films and FIGS. 16 and 17 are low density polyethylene at various thickness or weights per unit. FIG. 18 shows a composite film of polyethylene terphthalate, foil and BAREX™, an acrylonitrile film (48 ga PET/10.8# WLD/0.00035 Foil/ 10.8# EAA/3.5 mil BAREX).

DESCRIPTION OF PREFERRED EMBODIMENTS

Figure 1:
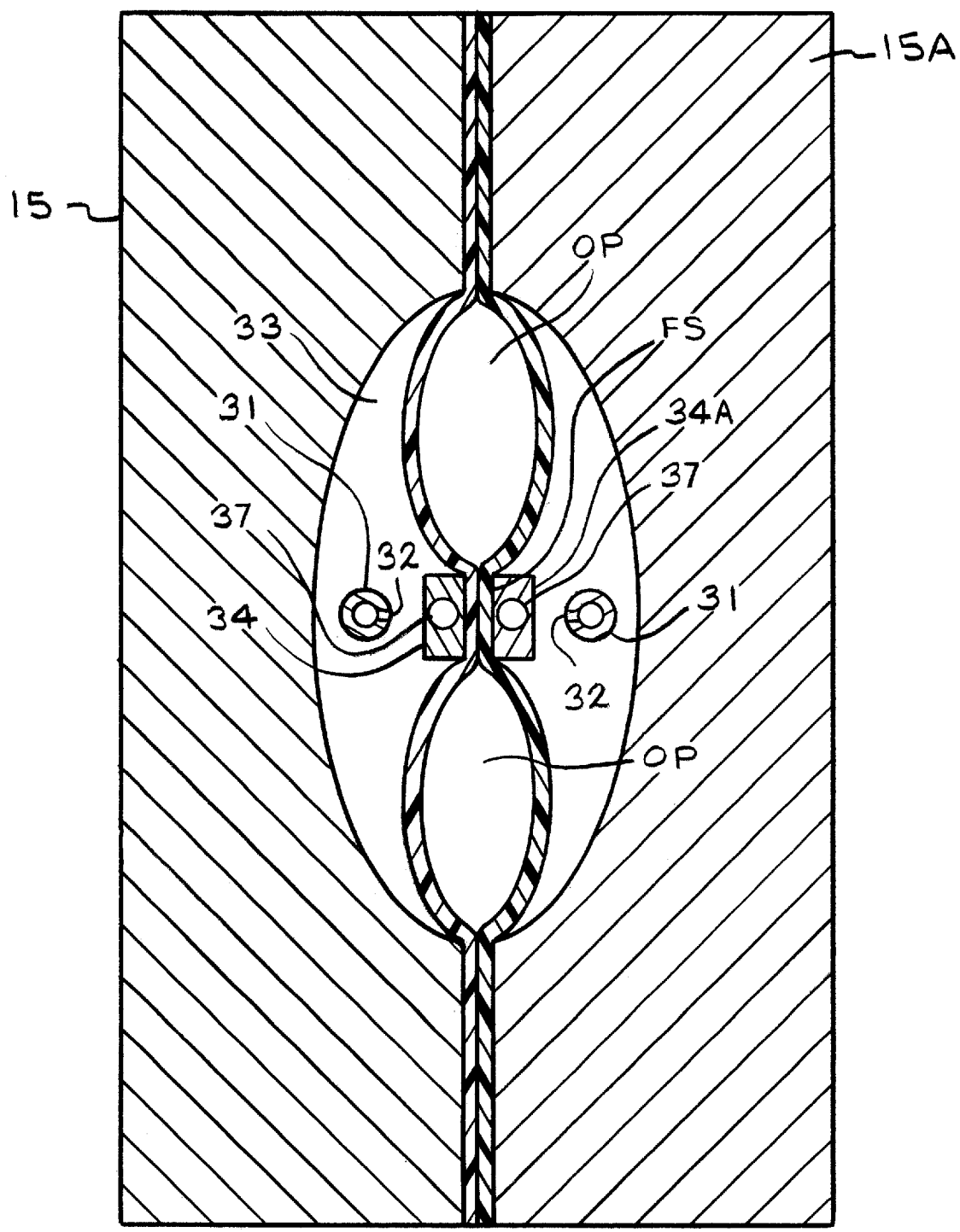
FIG. 1 is a plan cross-sectional view of a pair of dies 15 and 15A used to form a frangible seal FS in open pouch OP, wherein coolant fluid (gas or liquid) is directed at or through a bar or other exposed portion of the dies 15 and 15A.

FIG. 1 illustrates the basis of the present invention which relies upon the differential cooling by cooling a bar 34 or other heat sealing surface to lower the temperature at which the seal is formed. Optionally channels 37 are provided through the bar for the cooling fluid (gas or liquid).

The apparatus forms two open pouches OP between a frangible seal (FS) using spaced apart dies 15 and 15A with an inletted portion 33 around the bars 34 and 34A. Optionally a feed tube 36 can be provided in the bar and/or an air tube 31. Coolant is provided to and from the bars 34 and 34A as illustrated by the arms.

Figure 1A:
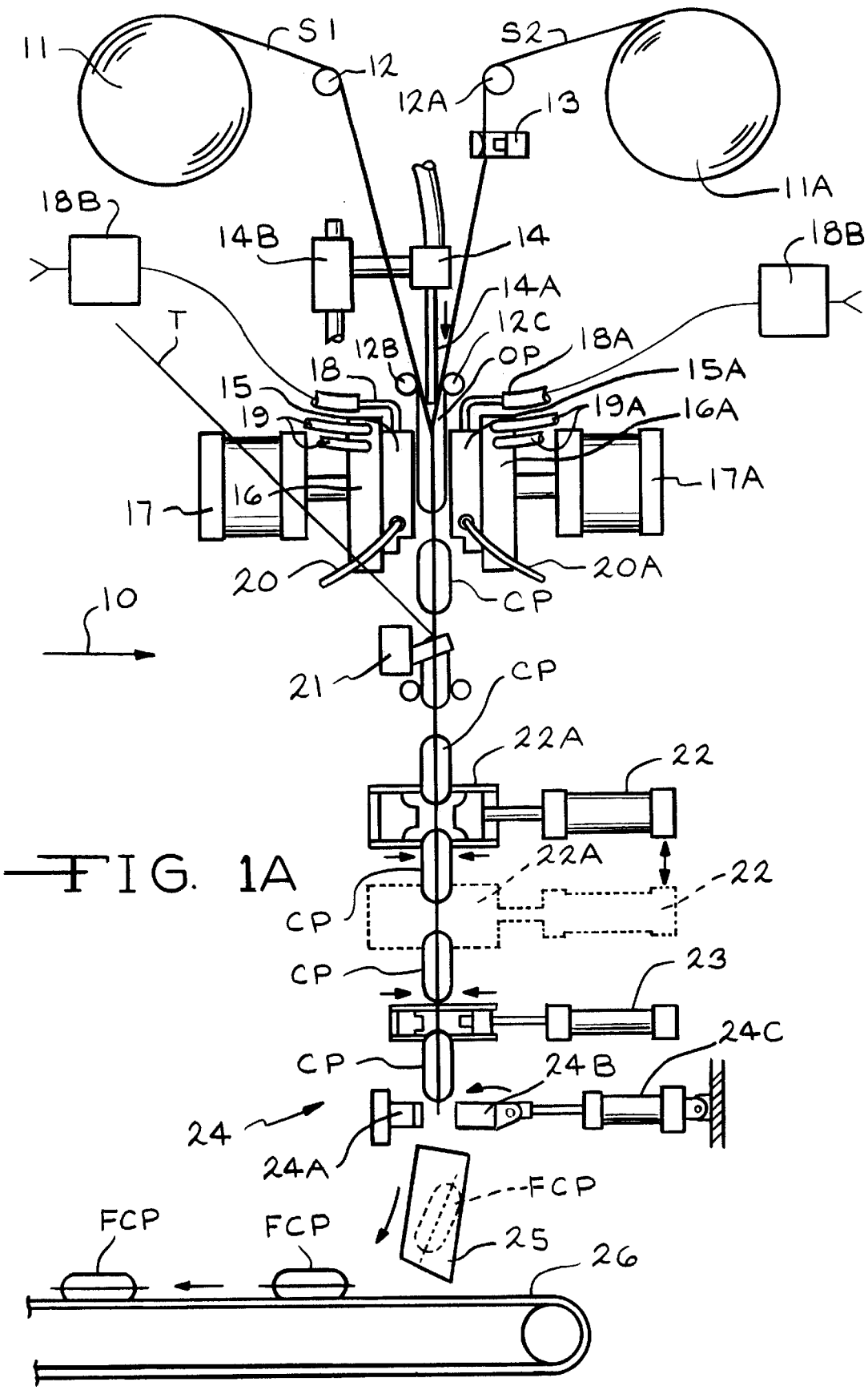
FIG. 1A is a side schematic view of the apparatus 10 for forming fluid closed pouches (FCP) containing various materials with a frangible seal using the differential cooling in dies 15 and 15A.
Figure 1B:
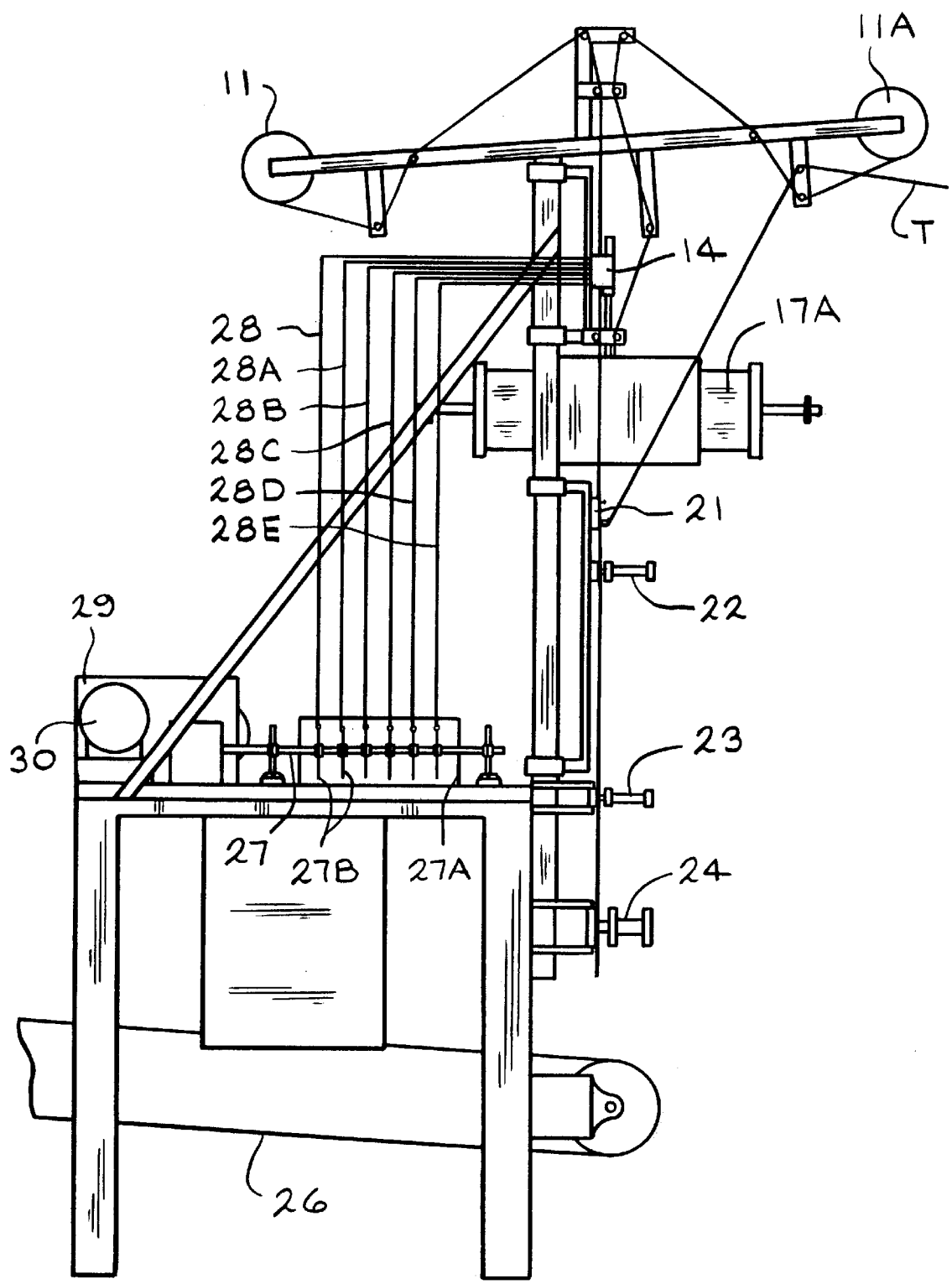
FIG. 1B is a side view of a vertical feed apparatus as illustrated schematically in FIG. 1.

The preferred pouch forming apparatus 10 of the present invention is shown in FIGS. 1A and 1B. FIG. 1A is a schematic view of the apparatus 10 shown in FIG. 1B. Such apparatus 10 are well known to those skilled in the art as "vertical feed" machines. Also well known are "horizontal feed" machines (not shown), such as described in U.S. Pat. No. 3,453,799 to Cloud et al, U.S. Pat. No. 4,201,031 to Wiles, U.S. Pat. No. 4,436,576 to Seiden and U.S. Pat. No. 5,181,365 to Garvey et al. Either type of machine can be used to practice the present invention on a continuous or intermittent feed basis. Also the present invention can be performed in a multistation system with separate machines which perform individual functions.

In the preferred vertical feed apparatus 10 as shown in FIG. 1A, dual rolls 11 and 11A feed separate plastic materials, films or sheets $S_1$ and $S_2$ over idler rollers 12, 12A, 12B and 12C. An electric eye sensor 13 determines the position of the sheet $S_2$ and holds it away from the sheet $S_1$. A fill manifold 14 with one or more nozzles 14A feeds a liquid (or other material) into an open pouch OP formed from the two sheets $S_1$ and $S_2$ by dies 15 and 15A which are moved horizontally together and apart. Solenoid valve 14B controls the flow of the fluid to the nozzle 14A. The dies 15 and 15A are a primary focus of the present invention and will be discussed in detail hereinafter. The dies 15 and 15A are mounted on shoes 16 and 16A and are moved by pneumatic cylinders 17 and 17A. The dies 15 and 15A are fed with air through meters 18B by lines 18 and 18A to cool portions of the dies 15 and 15A to provide differential sealing between the sheets $S_1$ and $S_2$ as described more fully hereinafter. The dies 15 and 15A are electrically heated by electrical wires 19 and 19A leading to a heater (not shown) mounted on the dies 15 and 15A. Thermocouples 20 and 20A detect the temperature of the dies 15 and 15A via wires 19 and 19A, which is used to regulate the temperature of the heater. Upon closing of the dies 15 and 15A to form the open pouch OP the dies also close a succeeding OP to form a closed pouch CP containing the material provided from the nozzle 14A. The closed pouch CP is then trimmed on opposed sides of the pouch by side knife 21 (one shown) to produce trim T which is removed. The closed pouches CP in the machine is indexed or advanced by pneumatic cylinder 22 with puller 22A as shown by the dotted lines. The closed pouch CP is marked with a serial number by coder 23. The closed pouch CP is cut into individual final closed pouches FCP by cutter 24 including knife 24A and a bar 24B on pneumatic cylinder 24C. The FCP is fed into a chute 25 and onto a conveyor 26 for subsequent handling.

Figure 1C:
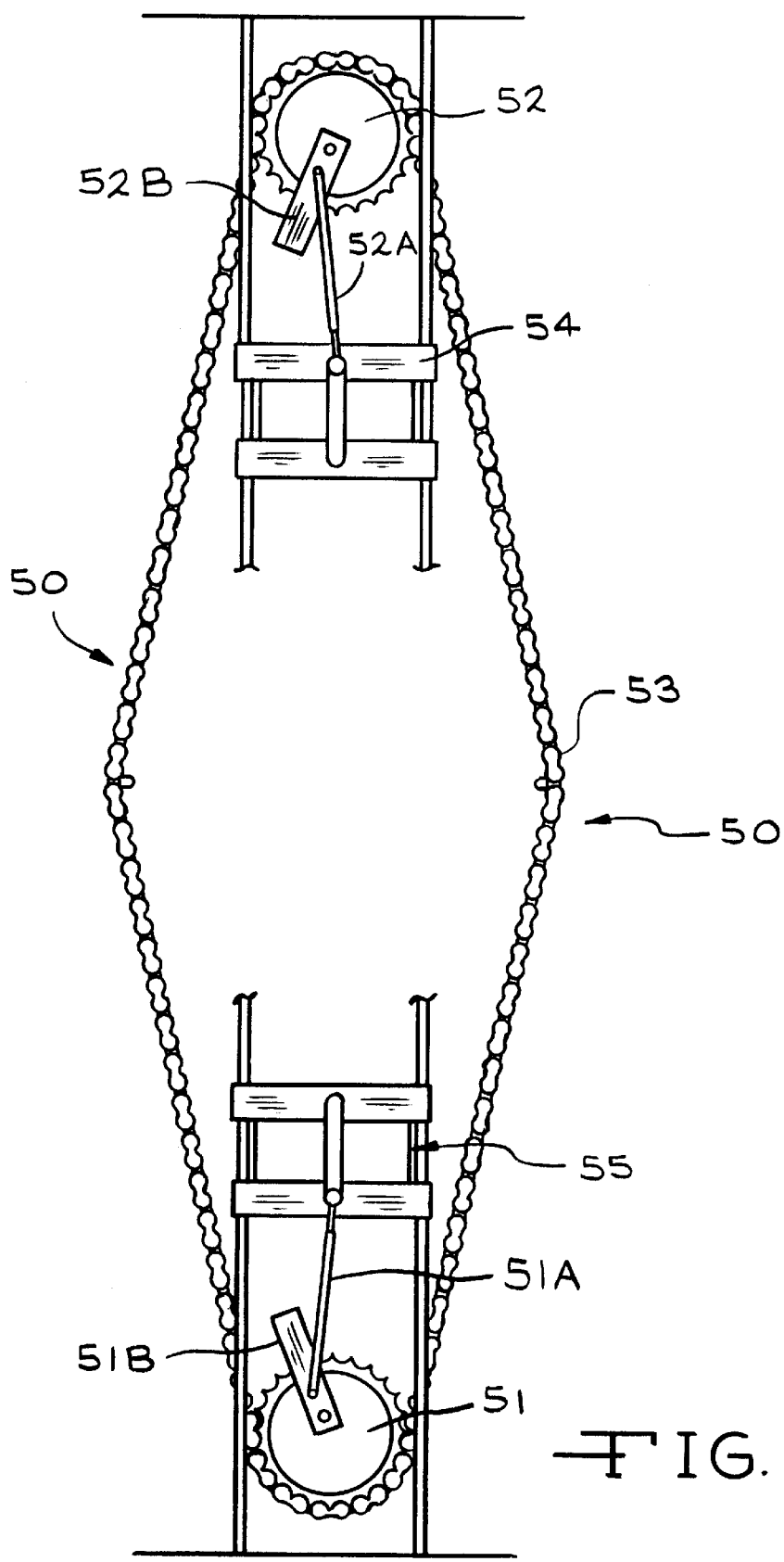
FIG. 1C shows a chain drive mechanism 50 for activating pistons (not shown) in the filler manifold 14 for moving the puller 22A in the apparatus of FIG. 1B.
Figure 3:
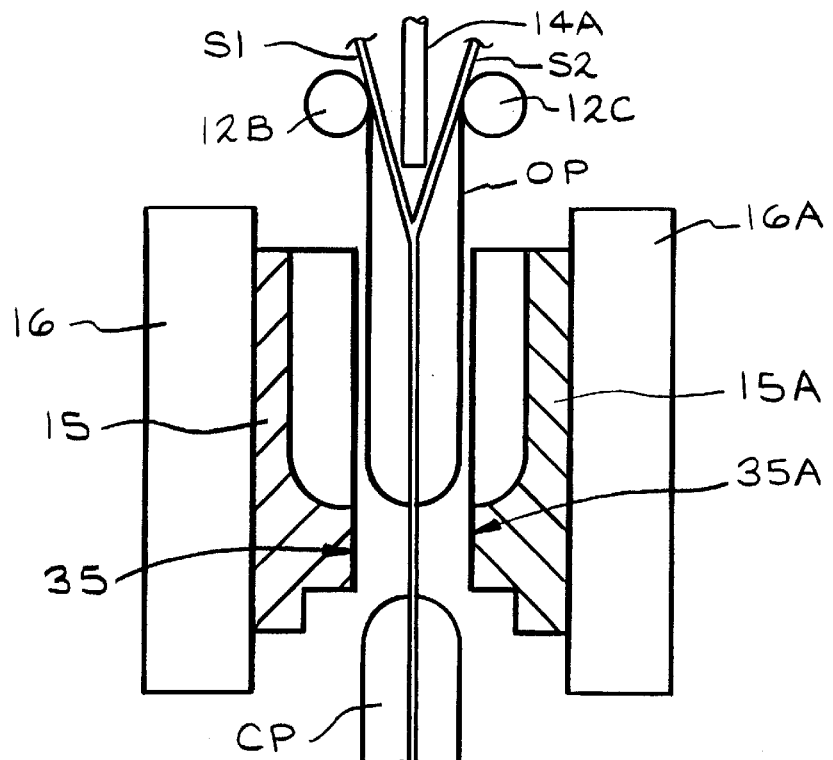
FIGS. 2 to 5 are schematic side views of the dies 15 and 15A shown in FIG. 1A in cross-section, particularly illustrating the stages for going from sheets $S_1$ and $S_2$ to the open pouch OP to the closed pouch CP in the apparatus of FIGS. 1A and 1B.
Figure 2:
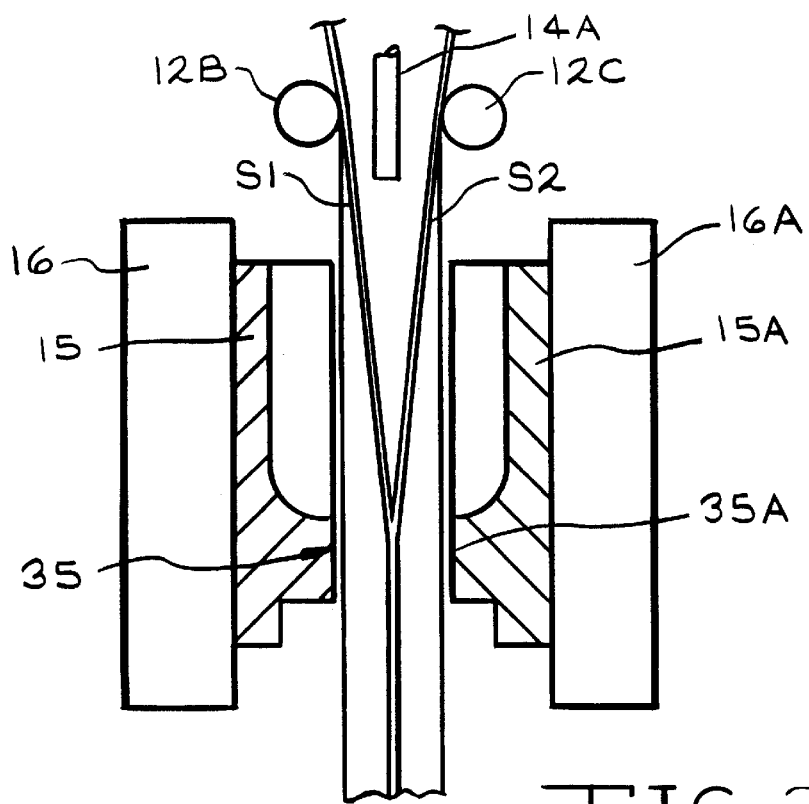
Figure 4:
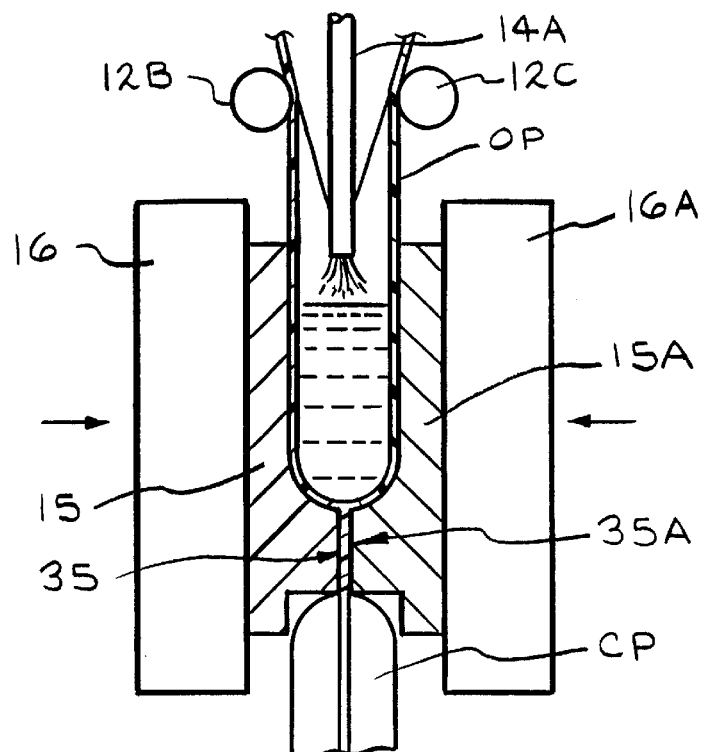
Figure 5:
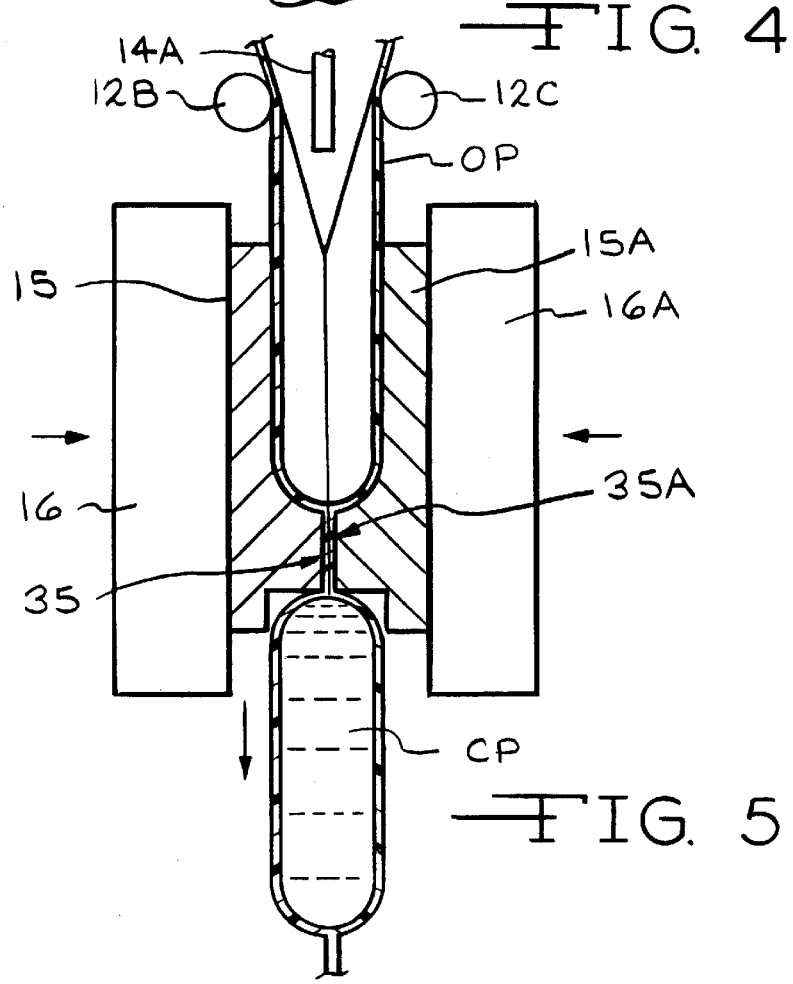

FIG. 1B shows the detail of the apparatus 10, illustrated schematically in FIG. 1A. A feed apparatus 27 with a capability of feeding up to six tubes 28, 28A, 28B, 28C, 28D, and 28E with liquid is provided. The feed apparatus 27 includes a rocker arm 27A which moves rockers 27B which engage pistons (not shown) which feed the tubes 28 to 28E. A power source 29 turns the rocker arm 27A and a pump 30 feeds the feed apparatus 27. A pump 30 is used to feed the material to the tubes 28 to 28E. Thus the apparatus 10 is designed to fill up to six (6) bags which are formed horizontally as six separate open pouches OP, closed pouches CP and final closed pouches FCP. The material introduced by the fill manifold 14 can be the same or different in each closed pouch CP. Also the closed pouch CP can be linked together rather than trimmed apart by the knives 21. FIG. 1C shows a chain drive mechanism 50. Lower and upper sprockets 51 and 52 are connected by chain 53. The sprockets are provided with rods 51A and 52A connected to eccentrics 51B and 52B and the sprockets 51 and 52. Drive 54 is connected to puller 22A. Drive 54 is connected to pistons (not shown) in the fill manifold 14. Lower sprocket 51 is driven by a motorized drive shaft (not shown). Offset on these cams allows for adjustability in speed and depth. Cutter 24, coder 23 and dies 15 and 15A all employ the use of a solenoid (not shown) for timing. The motor (not shown) is clutch driven and fully adjustable. The dies 15, 15A, puller 22A, coder 23 and cutter 24 are all pneumatically driven. The fill from the fill manifold 27 is by positive displacement.

FIGS. 2 to 5 are an exploded views showing the steps performed by the apparatus 10 at the dies 15 and 15A. The dies 15 and 15A are shown in cross section. A hard seal forming portion 35 and 35A of the dies 15 and 15A are heated to form the seal between sheets $S_1$ and $S_2$ in a U shape as shown in FIGS. 6 and 7. At least one side seal is formed as a Hard Seal HS.

Figure 8:
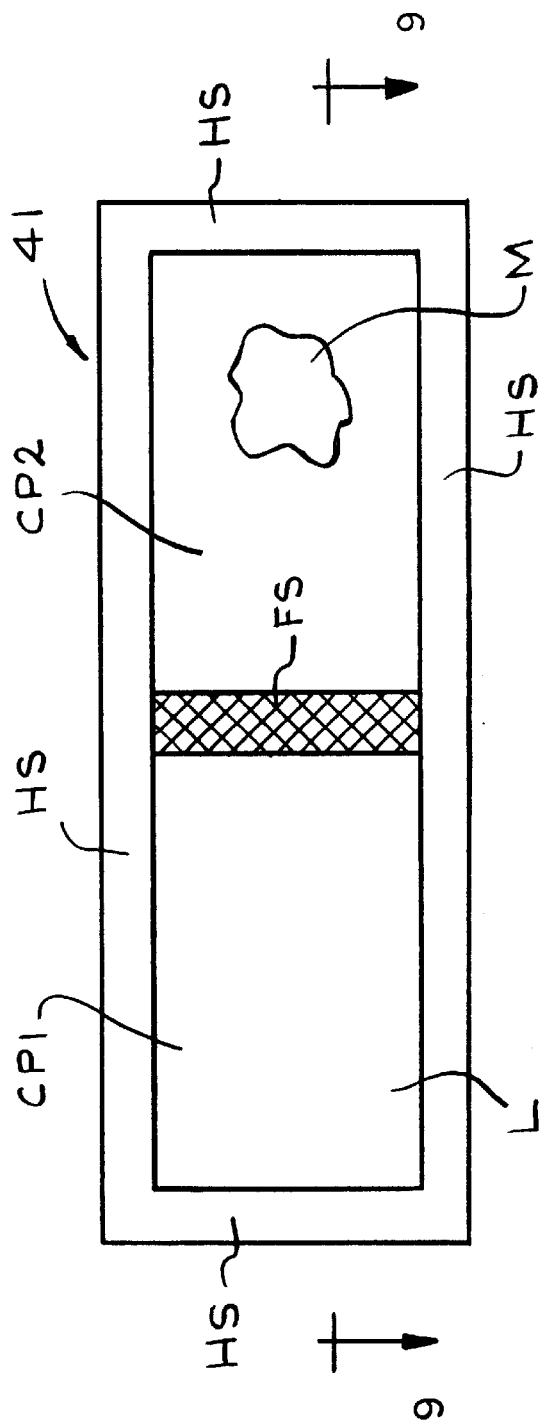
FIG. 8 is a front view of the final closed pouch 41 (FCP) from FIGS. 6 and 7 after sealing illustrating dual pouches separated by a frangible seal FS and surrounded by a hard seal HS.
Figure 9:
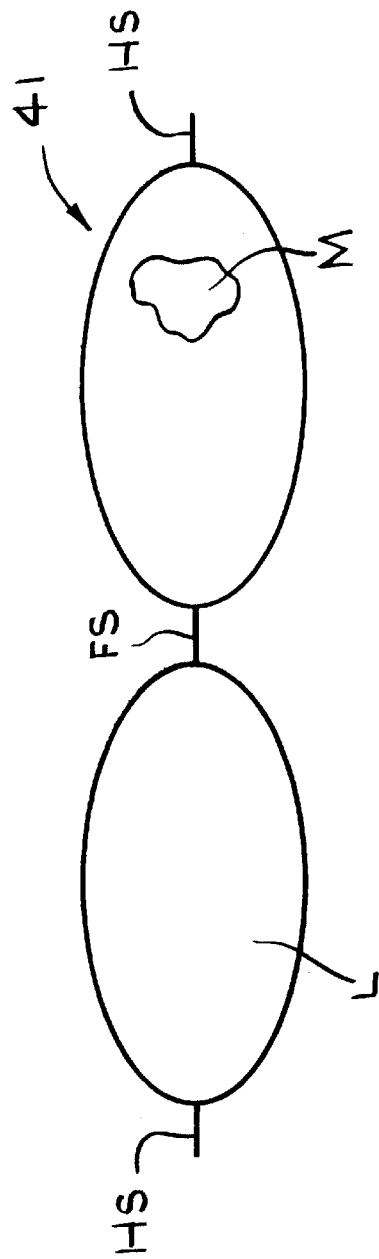
FIG. 9 is a plan cross-sectional view along line 9—9 of FIG. 8.

As shown in FIGS. 6 and 7 for the open pouches 40, the frangible seals FS indicated by cross hatch are weaker than the hard seals HS and 31A and are not cut by the knives 21. The frangible seals $FS_1$ and $FS_2$ are rupturable to provide a connection after the pouches are closed to provide a closed pouch CP 41 as shown in FIGS. 8 and 9. In this case OP1 is fed a liquid L and OP2 contains another material M. With the pouch shown in FIG. 8, when the frangible seal FS in CP 41 is ruptured the material M is reacted with or mixes with the liquid. The frangible seal FS can be ruptured by applying pressure to the pouches CP1 or CP2, particularly if one contains a liquid L. The frangible seal FS can also be pulled apart by grasping the sides of the final closed pouch FCP.

Figure 10:
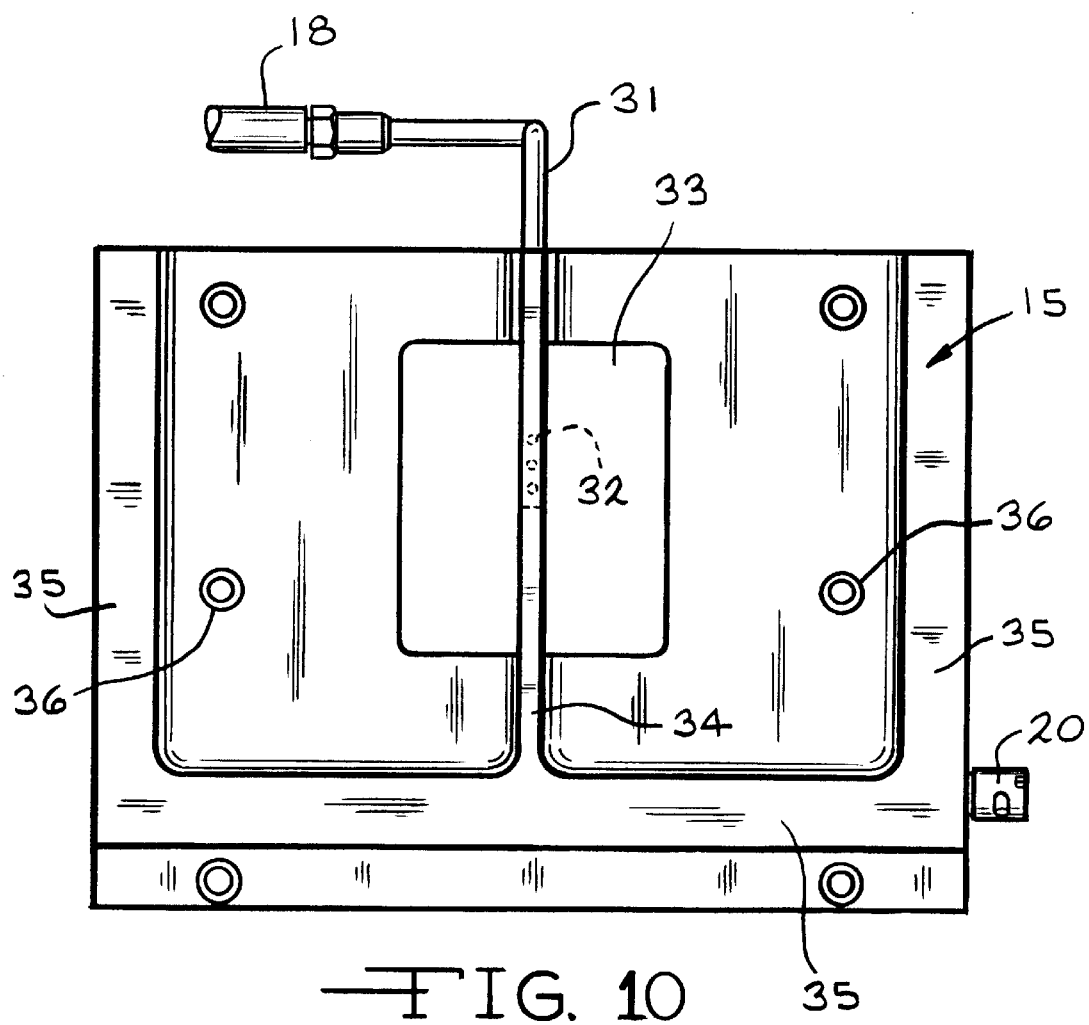
FIG. 10 is a front inside view of an inside face of die 15 along line 10—10 of FIG. 11, particularly showing inletted portion 33 around bar or platen 24 which is cooled by air from holes 32 in tube 31 to form a frangible seal FS.
Figure 11:
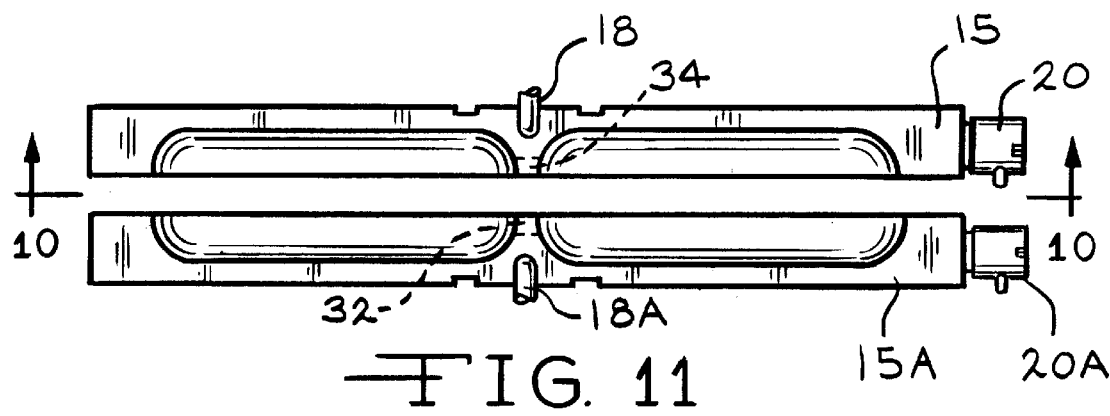
FIG. 11 is a plan view showing both dies 15 and 15A spaced apart before coming together to form the frangible seal FS along bar 34 as part of the seal portion of the dies 15 and 15A.

FIGS. 10 and 11 show the details of dies 15 and 15A used to produce the hard seal HS and the frangible FS in FIGS. 6 to 9. In particular, air line 18 is connected to tubes 31 (one shown) with perforations or holes 32 in an open inletted portion 33 above a frangible seal FS seal forming bars 34 and 34A which are cooled by air from the holes 32 thus reducing the temperature of the bar 34 and producing a frangible seal FS. The remaining seal forming portions 35 form the hard seal HS. The dies 15 and 15A are mounted on shoes 16 and 16A (FIG. 1A) by bolts in holes 36. The result is the dual pouch FCP 41 with the frangible seal FS produced by the cooled bars 34 and 34A shown in FIGS. 8 and 9.

In the preferred embodiment as shown in FIG. 10, air from line 18 through openings 32 cools the bar 34 externally. It will be appreciated that a cooling fluid could be provided inside and through the bar 34 through channels 37 (FIG. 1). The fluid can be a liquid or a gas which is cooled externally before being supplied through the channels 37 in the bar 34 although a cooling gas is preferred. The gas could be carbon dioxide or nitrogen and can be recycled. The liquid could be water or an oil. All of these variations will be obvious to one skilled in the art.

Figure 12:
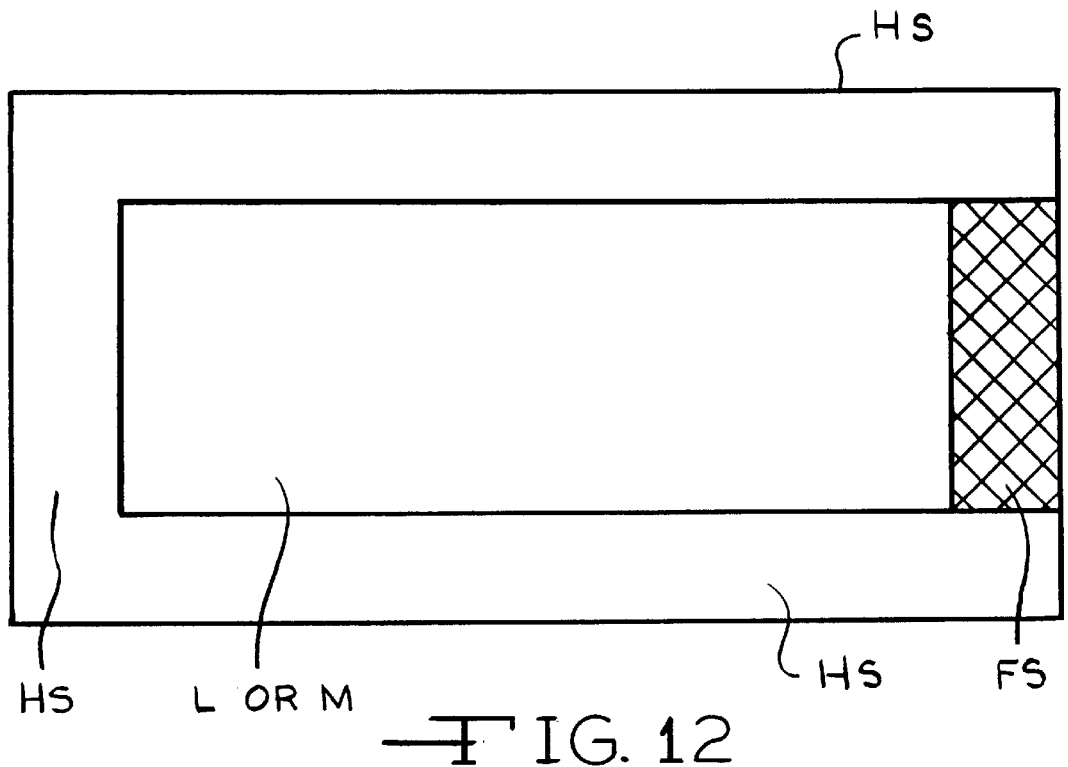
FIG. 12 is a front view of a single finished closed pouch 60 (FCP) with a hard seal HS and a frangible seal (cross hatched).
Figure 12A:
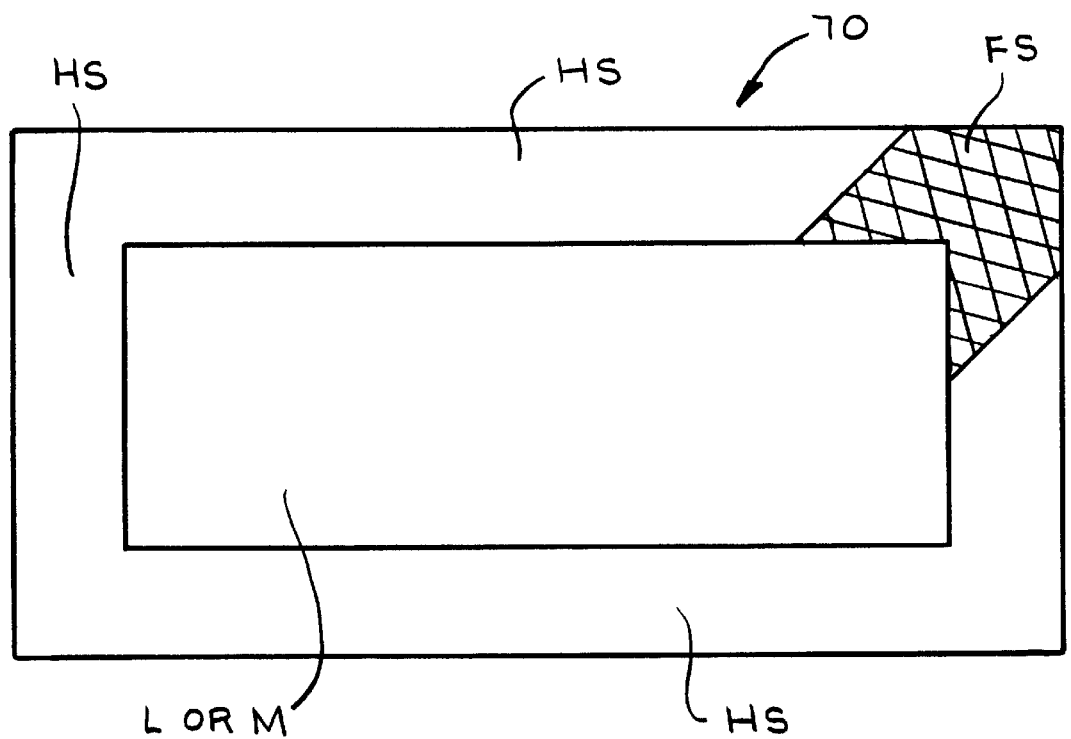
FIG. 12A is a front view of a different pouch 70 (FCP) with a corner F.S. (cross-hatched).
Figure 13:
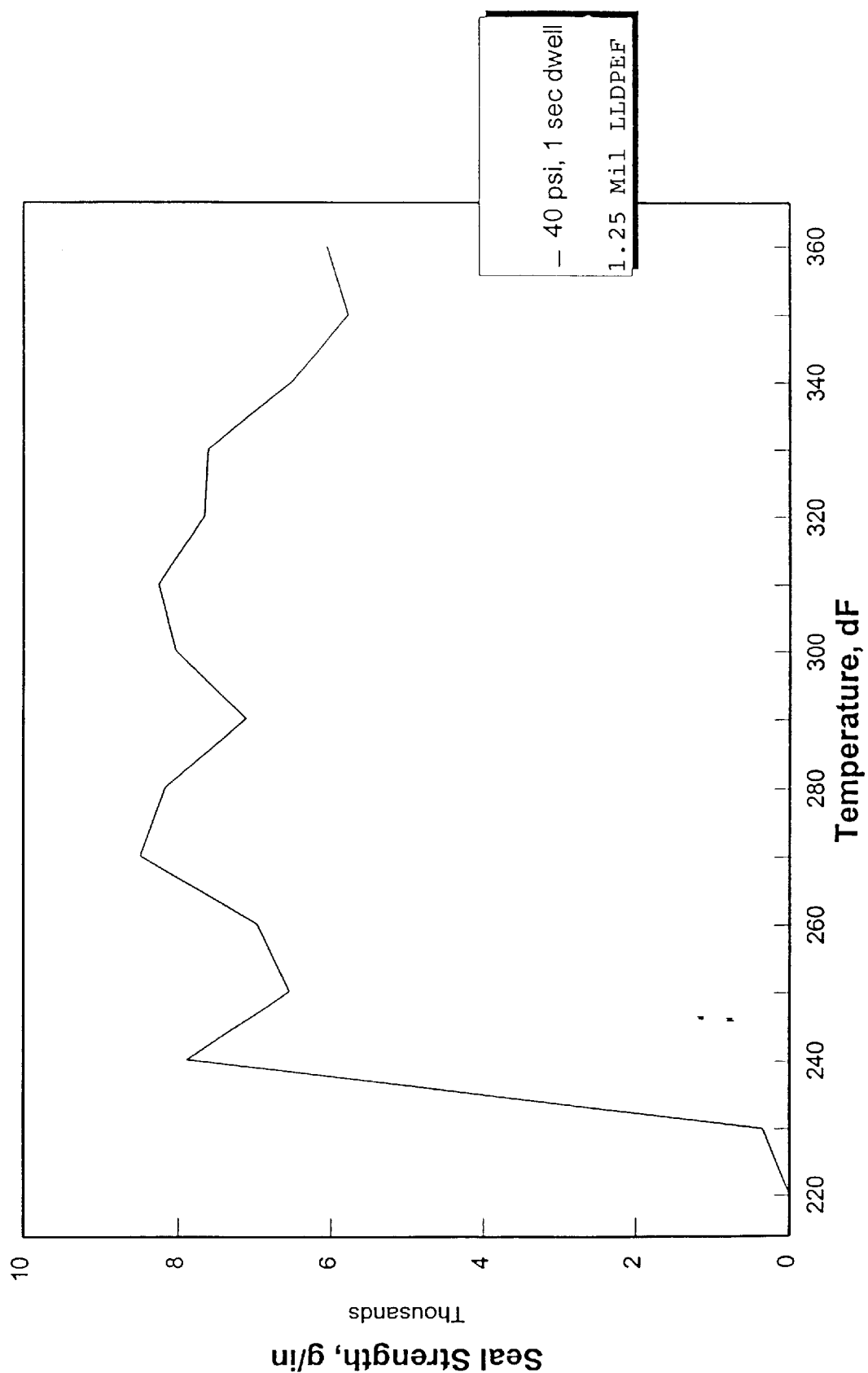
FIGS. 13 to 18 are graphs showing the burst strength of a seal as a function of temperature for various films.
Figure 14:
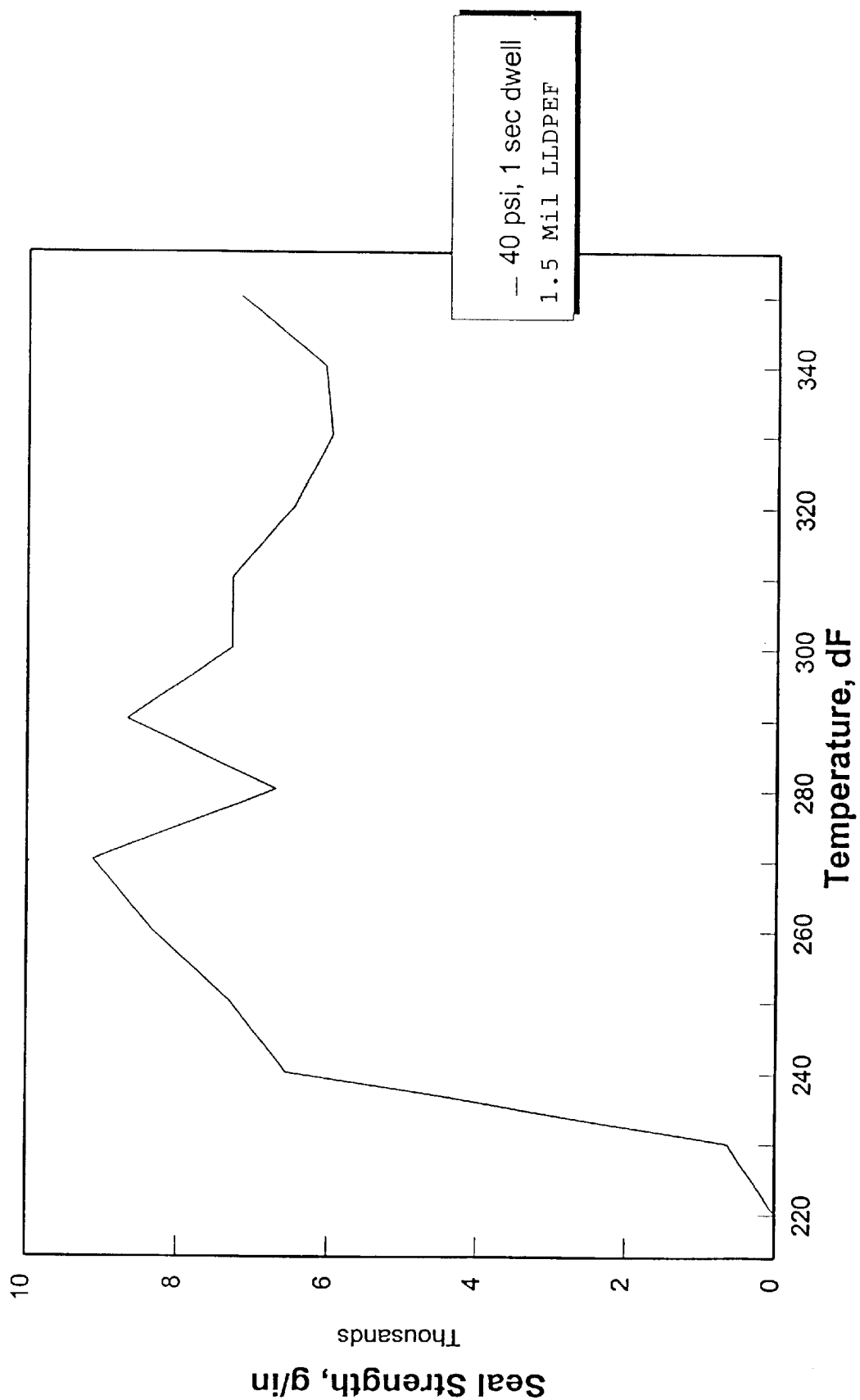
Figure 15:
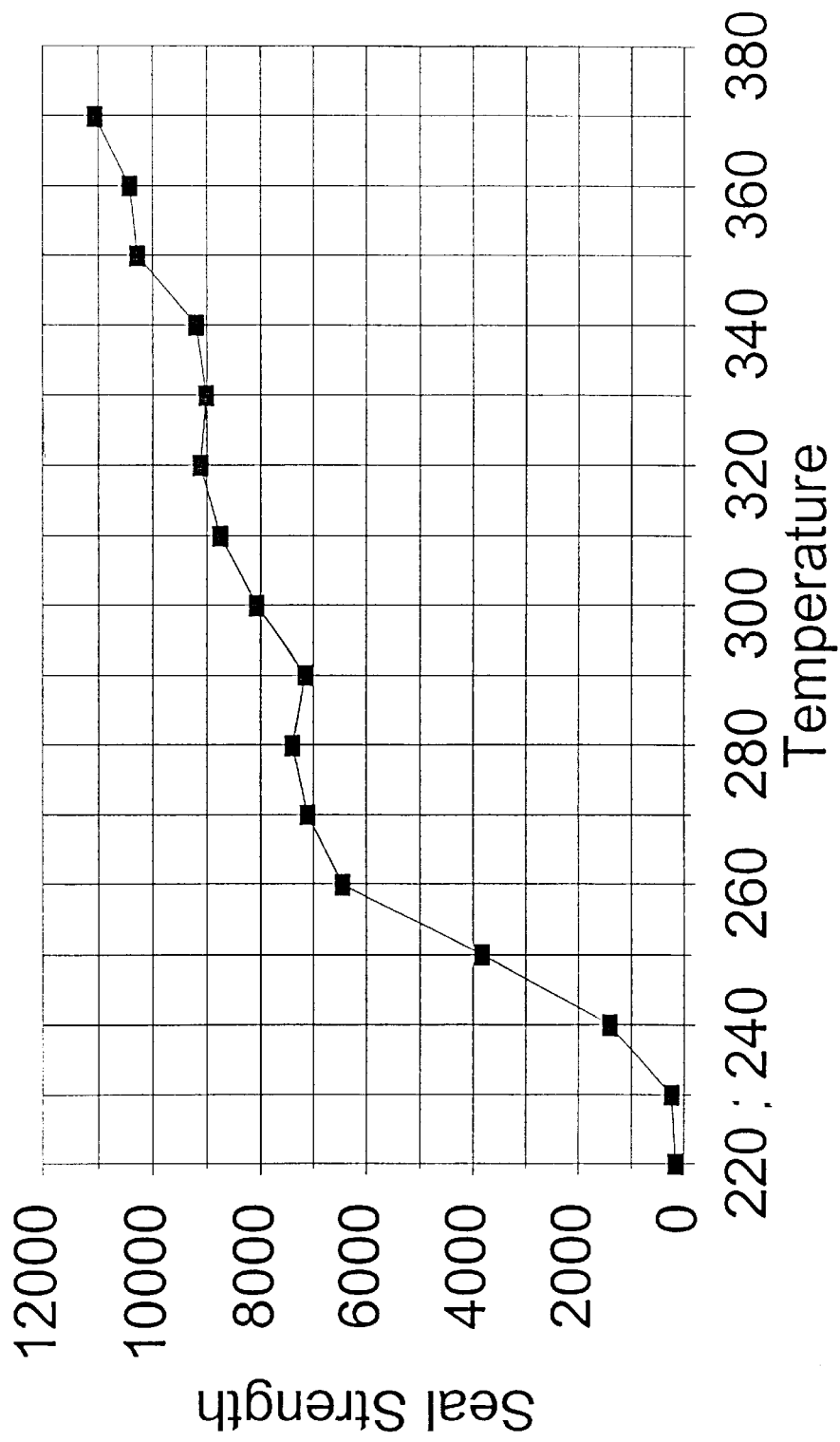
Figure 16:
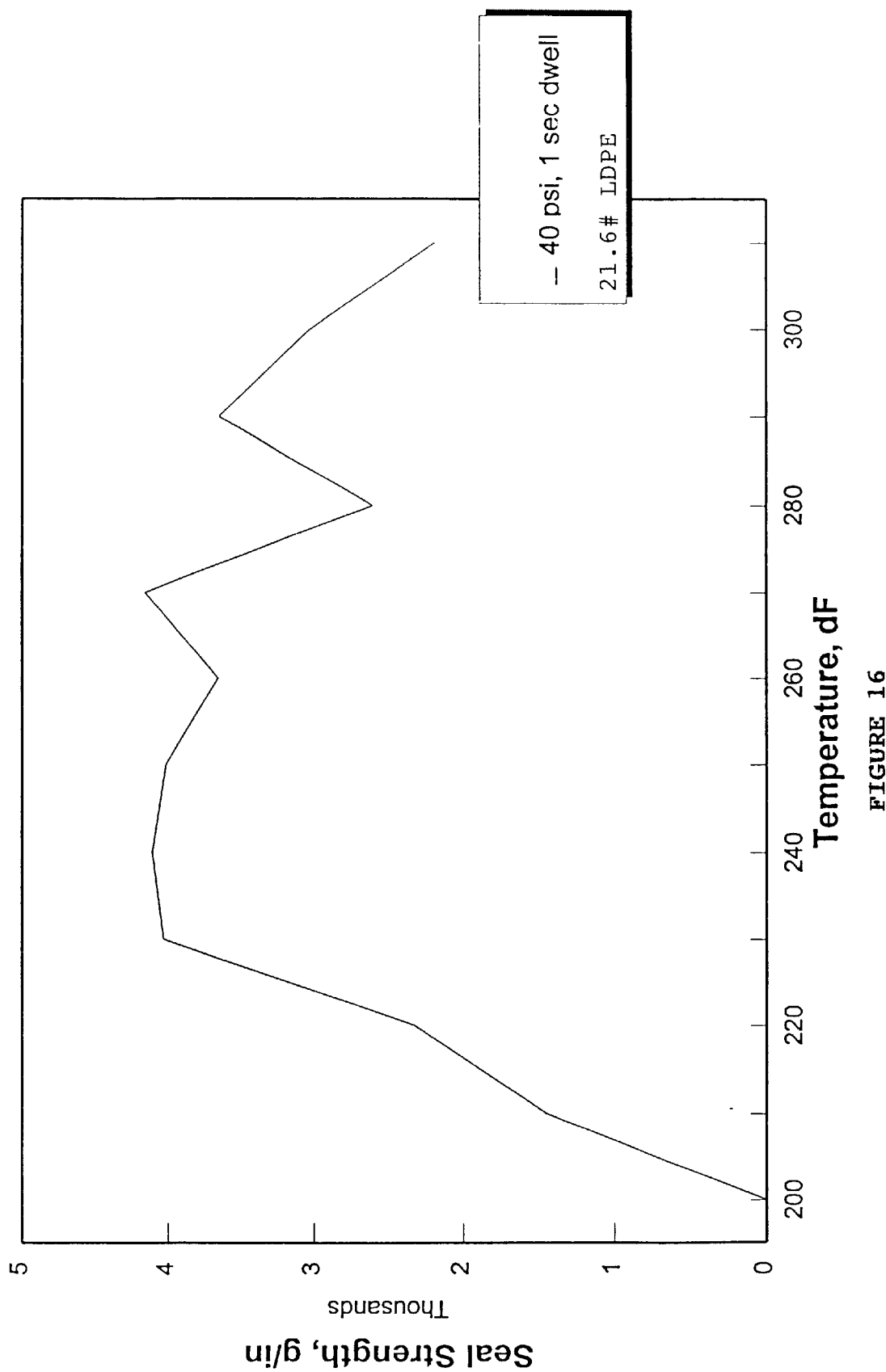
Figure 17:
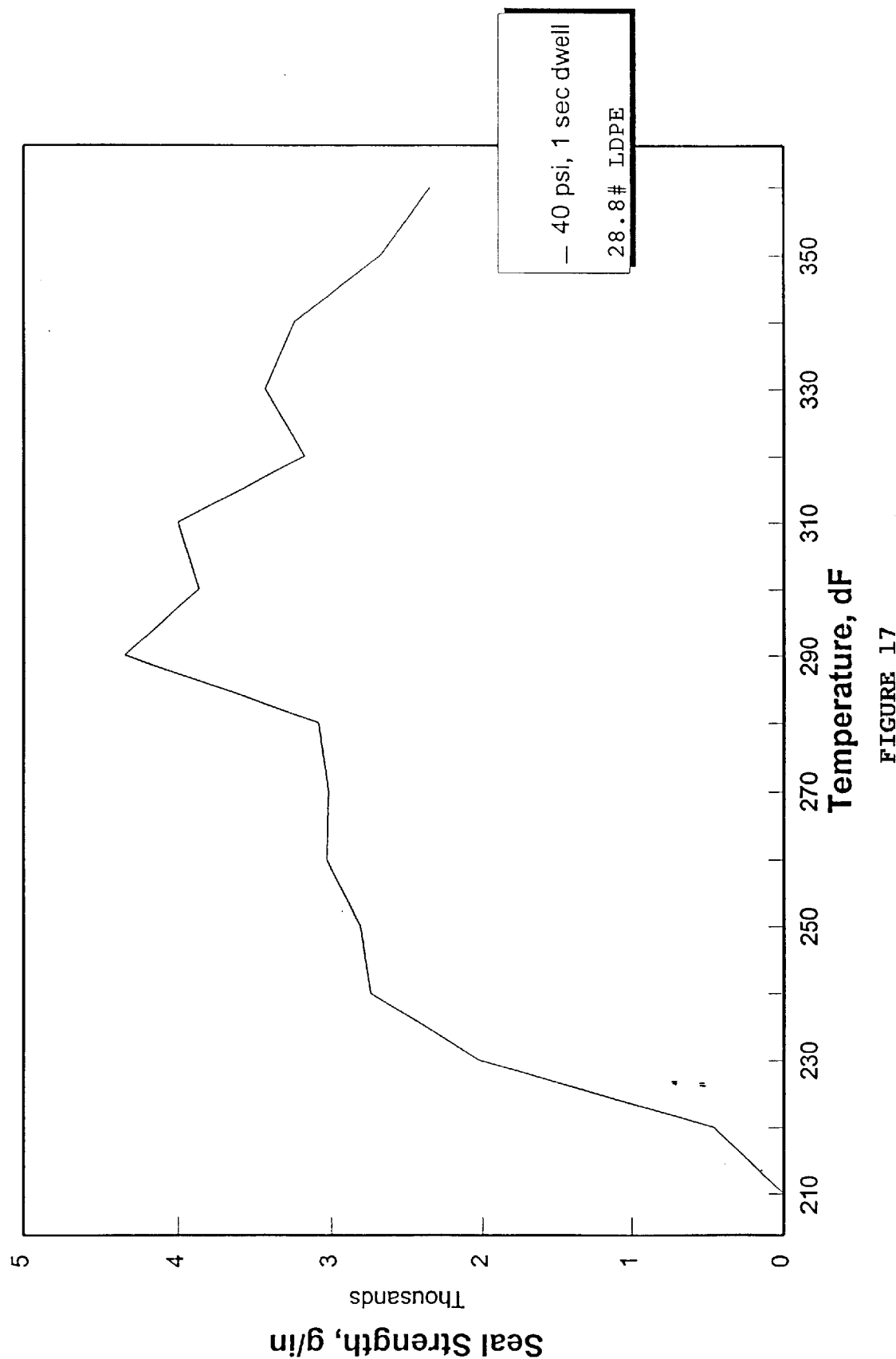
Figure 18:
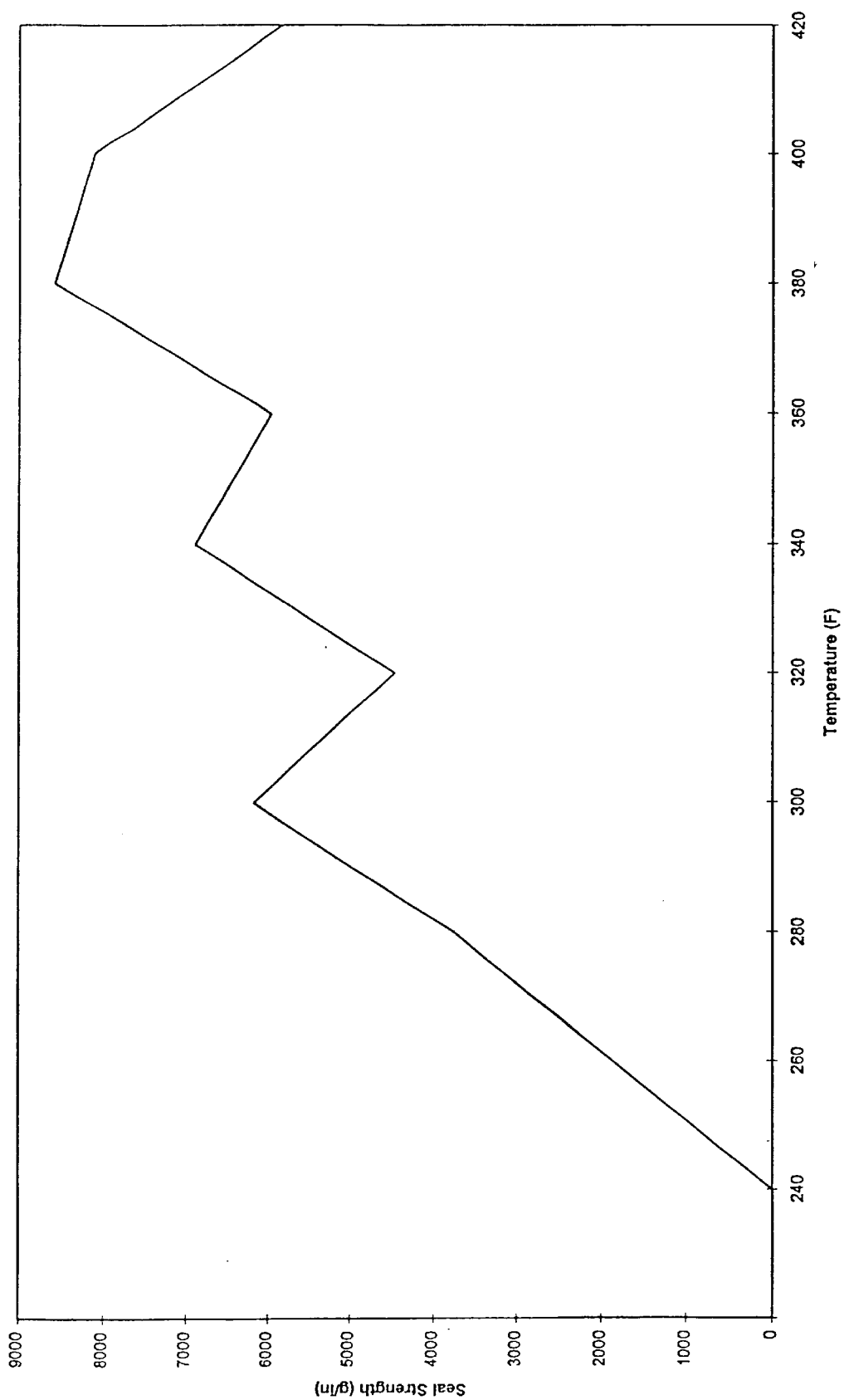

The final closed pouches FCP can also be formed by trimming between each individual pouch at the frangible seal FS. In this event, both the HS and FS are cut as the pouches are formed. In this event, the pouches 60 and 70 have a single frangible seal FS as shown in FIGS. 12 and 12A.

As can be seen from FIGS. 13 to 18, the strength of the frangible seal FS for the sheets or films is directly related to the temperature of the sealing dies 15 and 15A. The pressure of the die or dies insures that there is intimate contact of the films $S_1$ and $S_2$. LLDPE is linear low density polyethylene. BAREX™ is an acrylonitrile film available from Greenway Plastic Industry Corporation, Wayne, N.J. The seal strength is measured in grams per inch (or centimeter) necessary to separate the frangible seal FS using a Tinius Olsen, tensile strength testing (ASTM D-882) apparatus. Preferably the seal strength is between 200–1500 gm/inch. The present invention permits 1) creation of a cool zone which allows a single die to make both frangible and hard seals; and 2) the target seal strength varies with relatively small swings in sealing die temperature. Many sealing die control systems have a temperature variation of ±15 degrees fahrenheit. The present invention can reduce this variation significantly. The present invention enables seal strength management. Preferably the seal strength of a given film can be maintained at a 300 gram per inch range while maintaining seal strength. This seal strength range is managed by sealing films with known seal strength characteristics in the sealing die that has differential sealing temperatures across the surface area of the dies. Sealing temperatures are controlled by regulated heat sources used in conjunction with the application of cooling fluid used to cool portions of the die which forms the frangible seal. Application of cooling fluids may be controlled by regulators, flow meters or other flow control valves or methods. The curves are quite steep, so that maintaining the temperature differential in the method and apparatus of the present invention provides the necessary control over the formation of the FS and HS seals. The temperature differential in a sealing die from FS to HS in a single sealing die can be between 50 to 75° F. which in a single die 15 would be impossible without the present invention.

The plastic materials, films or sheets can be any of sheet stock, roll stock, film or formed parts or any other forms of packaging materials well known by those skilled in the art. The thermoplastic polymers used in the present invention are well known to those skilled in the art and are previously noted in the patents listed. These polymers soften as a function of the temperature achieved by the film and bond or weld to other films which can be of the same or different thermoplastic composition. The polymers can be natural or synthetic. Sometimes the term "thermoplastic resins" is used in the art for "thermoplastic polymers" and it is intended that they be treated the same. The thermoplastic polymers are contrasted with "thermoset" polymers which decompose but do not soften upon heating. However, there are numerous hybrid and mixed polymers which are the equivalent of the thermoplastic polymers for the purpose of the present invention. Preferred polymers are the polyalkylene oxide polymers (polyethylene, polypropylene, polybutylene, the terphthalate polymers (PET) and polyolefins, such as vinyl resins such as vinyl acetate, vinyl chloride, and styrene.

Rotary sealing systems are described in Packaging Technology and Engineering, Jul. 28 to 30, 1999. Unlike platen or flat sealing die systems, rotary sealing systems utilize heated wheels to produce side seals on pouches. These wheels have a continuous or intermittent motion. The cross seals on these machines can be formed by continuous motion wheels or dies activated by mechanical index or by use of a photocell. Pressure is applied by tension springs or controlled pneumatic cylinders. The seal is formed by passing the packaging film between heated wheels or between a heated wheel and a non-heated backer plate or wheel. The present invention includes such rotary wheel sealing apparatus.

Figure 19:
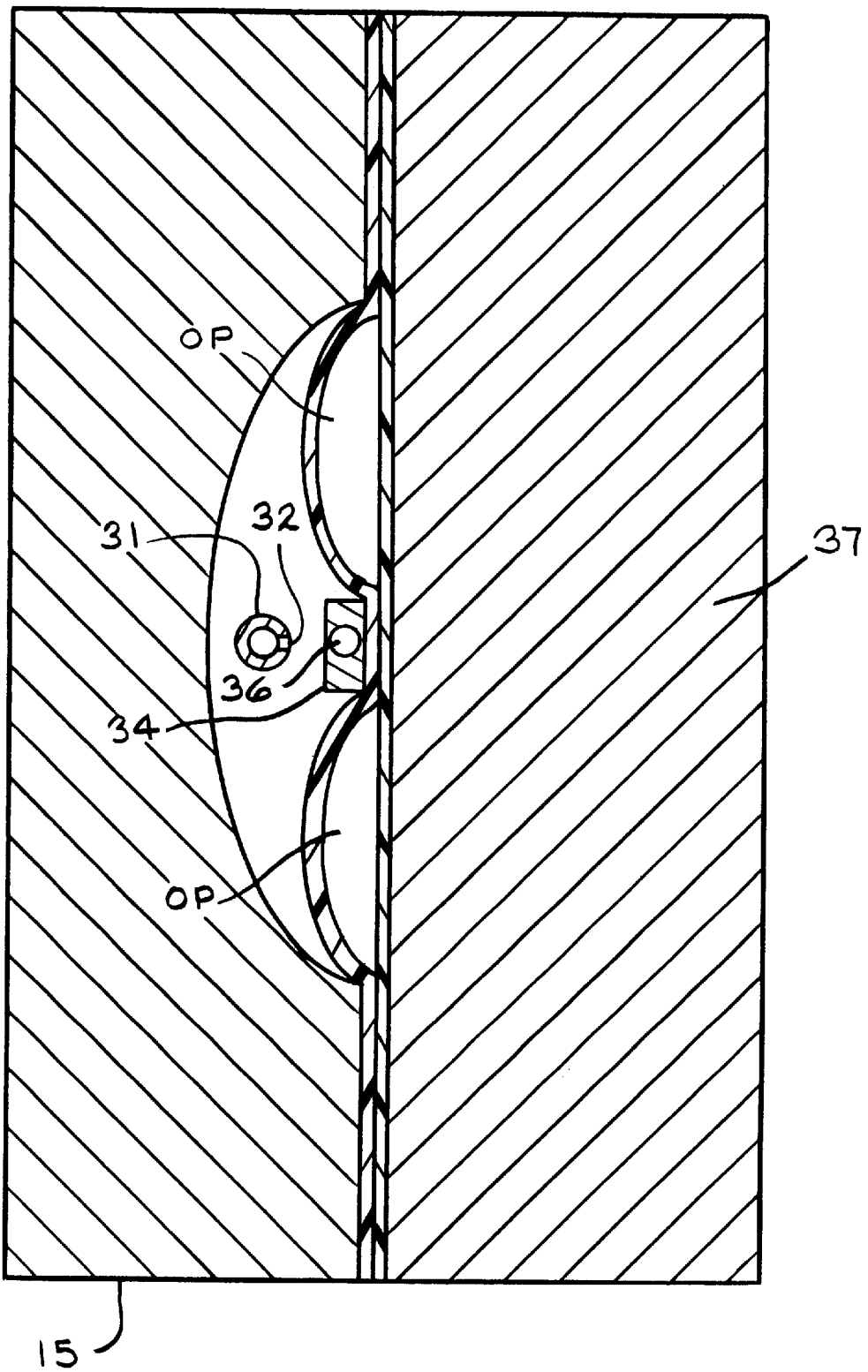
FIG. 19 is a plan cross-sectional view of a single die 15 with a backing plate 37.

The term "die" as used herein with the differential heating seal portions encompass a curved rotary wheel sealing which is heated or a flat sealing die as described in detail herein. Also in these systems a single die can be used, as shown in FIG. 19, with a backing plate 37 against which the die 15 moves with the heat sealable films between them. All of these variations will become apparent to those skilled in the art. The term "platen", "bar" or "sealing jaw" are sometimes used in the art and are dies.

It is intended that the foregoing description be only illustrative of the present invention and that the present invention be limited only by the hereinafter appended claims.

We claim:

1. A die for differentially heat sealing a film to another sealable material which comprises:
   (a) a plate having a hard seal forming portion around a cavity provided in the plate and a frangible seal forming portion provided in the cavity; and
   (b) conduit means mounted in the plate for selectively providing a cooling fluid to the frangible seal forming portion of the plate for cooling the frangible seal forming portion of the plate provided in the cavity in the plate.

2. A die which is half of a pair of dies for differentially heat sealing opposed contacting sheets of a plastic film to form a pouch defined by a peripheral seal which comprises:
   (a) a plate having a hard seal forming portion around a cavity for defining an inside of the pouch provided on the plate and a frangible seal forming portion provided in the cavity, wherein the frangible seal forming portion of the plate is inletted to provide an opening around the frangible seal forming portion; and
   (b) conduit means mounted in the plate for selectively providing a cooling fluid to the frangible seal forming portion of the plate where the plate is inletted for cooling the frangible seal forming portion of the plate provided in the cavity in the plate.

3. The die of claim 2 wherein the plate is integral.

4. The die of claim 2 wherein the plate has ridges on the frangible seal forming portion which provide a ridged seal.

5. The die of claim 4 wherein the ridges are cross-hatched.

6. The die of any one of claims 2 to 5 wherein the frangible seal forming portion of the plate is a bar in the inletted portion and wherein the conduit means is a tube for providing a cooling gas to an opening in the tube for directing the gas at a side of the bar opposite a face of the bar which provides the part of the seal.

7. The die of any one of claims 2 to 5 wherein the frangible seal forming portion of the plate is a bar in the inletted portion and wherein the conduit means is a tube for providing a cooling gas to an opening in the tube for directing the gas at a side of the bar opposite a face of the bar which provides the part of the seal, and wherein there are multiple of the openings in the tube facing the bar.

8. An apparatus for differentially heat sealing a plastic film to a sealable material which comprises:
   (a) a pair of dies for heat sealing at least one of which comprises: a plate having a hard seal forming portion around a cavity provided in the plate and a frangible seal forming portion provided in the cavity of the plate; and conduit means mounted in the plate for selectively providing a cooling fluid to the frangible seal forming portion of the plate for cooling the frangible seal forming portion of the plate provided in the cavity in the plate;
   (b) a fluid supply line connected to the conduit means mounted in the die;
   (c) heating means in the pair of dies for heating the dies to provide the seal;
   (d) motive means for closing the die against the plastic film to form the seal; and
   (e) feed means for feeding the plastic film between the dies so that the motive means for closing the die can close the die against the film to provide the seal with the sealable material.

9. An apparatus for differentially heat sealing opposed contacting sheets of a plastic film to form an individual pouch defined by a peripheral seal which comprises:
   (a) a pair of dies for heat sealing opposed contacting sheets of a plastic film to form a pouch defined by a peripheral seal, one die of which comprises: a plate having a hard seal forming portion around a cavity provided in the plate and a frangible seal forming portion provided in the cavity of the plate defining an inside of the pouch, wherein the frangible seal forming portion of the plate is inletted to provide an opening around the frangible seal forming portion; and conduit means mounted in the plate for providing a cooling fluid to the frangible seal forming portion of the plate where the plate is inletted for selectively cooling the frangible seal forming portion of the plate provided in th cavity in the plate;
   (b) a fluid supply line connected to the conduit means mounted in the die;
   (c) heating means in the pair of dies for heating the dies to provide the seal;
   (d) motive means for closing the dies against the plastic film to form the seal;
   (e) feed means for feeding the sheets of plastic film between the dies so that the motive means for closing the dies can close the dies to provide the seal; and
   (f) shear means for cutting the sheets to separate multiple of the pouches formed in the sheets into individual pouches.

10. The apparatus of claim 9 wherein the plate is integral.

11. The apparatus of claim 9 wherein the plate has ridges on the frangible seal forming portion to provide a ridged seal.

12. The apparatus of claim 11 wherein the ridges on the seal forming portion of the die are cross-hatched.

13. The apparatus of any one of claims 9 to 12 wherein the frangible seal forming portion of the plate which is a bar or platen in the inletted portion and wherein the conduit means is a tube for a cooling gas to an opening in the tube for directing the gas at a face of the bar opposite a face of the bar which provides the part of the seal.

14. The apparatus of claim 9 wherein the frangible seal forming portion of the plate is a bar in the inletted portion and wherein the conduit means is a tube for providing a cooling gas to an opening in the tube for directing the gas at a side of the bar opposite a face of the bar which provides the part of the seal, and wherein there are multiple of the openings in the tube facing the bar.

15. The apparatus of claim 9 wherein the feed means feeds the sheets of plastic film between the dies intermittently.

16. A method for differentially heat sealing a plastic material to a sealable material which comprises:
   (a) a pair of dies for heat sealing at least one of which comprises: a plate having a hard seal forming portion around a cavity provided on the plate and a frangible seal forming portion provided in the cavity of the plate; and conduit means mounted in the plate for selectively providing a cooling fluid to the frangible sel forming portion of the plate for cooling the frangible seal forming portion of the plate provided in the cavity in the plate; a fluid supply line connected to the conduit means mounted in the die;
   heating means in the pair of dies for heating the dies to provide the seal; motive means for closing the die against the plastic film to form the seal; and feed means for feeding the plastic material between the dies so that the motive means for closing the die can close the die against the material to provide the seal with the sealable material;
   (b) feeding plastic material between the dies and the sealable material;
   (c) closing the die with the motive means so that the heating means seals the plastic material to the sealable material;
   (d) removing the sealed plastic material and the sealable material from the apparatus.

17. A method for forming a pouch defined by differentially heat sealed opposed sheets of a plastic material which comprises:
   (a) heating dies for forming the seal provided in an apparatus for heat sealing opposed contacting sheets of a plastic material to form an individual pouch defined by a peripheral seal which comprises: a pair of dies for heat sealing opposed contacting sheets of a plastic material to form a pouch defined by a peripheral seal, one die of which comprises: a plate having a hard seal forming portion around a cavity provided in the plate and a frangible seal forming portion provided in the cavity of the plate defining a n inside of the pouch, wherein the frangible seal forming portion of the plate is inletted to provide an opening around th e frangible seal forming portion; and conduit means mounted in the die for selectively providing a cooling fluid to the frangible seal forming portion of the plate where the plate is inletted for cooling the frangible seal forming portion of the plate provided in the cavity in the plate; a gas supply line connected to the conduit means mounted in the die with a gas flow rate meter in the line; heating means in the pair of dies for heating the dies to provide the seal; motive means for closing the dies against the plastic material to form the seal; feed means for feeding the sheets of plastic material between the dies so that the motive means for closing the dies can close the dies to provide the seal; and shear means for cutting the sheets to separate multiple of the pouches formed in the sheets into individual pouches;

(b) feeding the sheets of plastic material between the dies;

(c) closing the dies with the motive means so that the heating means forms the pouch wherein the gas from the gas supply means cools the frangible seal forming portion which is in the portion of the plate which is inletted;

(d) feeding the sheets with the pouch from between the dies; and (e) shearing the pouch from the sheets wherein the pouch has differentially sealed opposed sheets forming the pouch.

18. The method of claim 17 wherein the plate is integral.

19. The method of claim 17 wherein the plate has ridges on the frangible seal forming portions which provide ridged seals.

20. The method of claim 19 wherein the ridges are cross-hatched.

21. The method of any one of claims 17 to 20 where the frangible seal forming portion of the seal is a bar in the inletted portion and wherein the conduit means is a tube for a cooling gas to an opening in the tube for directing the gas at a side of the bar opposite a face of the bar which forms the part of the seal.

* * * * *

UNITED STATES PATENT AND TRADEMARK OFFICE
CERTIFICATE OF CORRECTION

PATENT NO. : 6,342,123 B1
DATED : January 29, 2002
INVENTOR(S) : Blake M. Rees and Brian L. Rockafellow It is certified that error appears in the above-identified patent and that said Letters Patent is hereby corrected as shown below:

<u>Title page,</u>
ABSTRACT,
Line 3, "a" after "cooling" and before "seal" should be deleted.

<u>Column 6,</u>
Line 43, "an" after "are" and before "exploded" should be deleted.

<u>Column 9,</u>
Line 54, "th" should be -- the --.

<u>Column 10,</u>
Line 29, "sel forming" should be -- seal forming --.

Signed and Sealed this

Eighteenth Day of June, 2002

*Attest:*

*Attesting Officer*

JAMES E. ROGAN
*Director of the United States Patent and Trademark Office*